United States Patent [19]

Johnson, Jr. et al.

[11] Patent Number: 5,019,167

[45] Date of Patent: May 28, 1991

[54] STABILIZED ROSIN ESTERS AND HOT MELT ADHESIVES CONTAINING THEM

[75] Inventors: Robert W. Johnson, Jr.; Kenneth E. Krajca, both of Savannah, Ga.

[73] Assignee: Union Camp Corporation, Wayne, N.J.

[21] Appl. No.: 561,255

[22] Filed: Jul. 30, 1990

Related U.S. Application Data

[63] Continuation of Ser. No. 211,499, Jun. 24, 1988, abandoned.

[51] Int. Cl.$^5$ .............................................. C08L 93/04
[52] U.S. Cl. ................................. 106/218; 106/241; 524/272
[58] Field of Search ................. 106/218, 241; 524/272

[56] References Cited

U.S. PATENT DOCUMENTS

| | | | |
|---|---|---|---|
| 2,346,992 | 4/1944 | Palmer et al. | 106/218 |
| 2,825,657 | 3/1958 | Mock et al. | 106/241 |
| 4,248,770 | 2/1981 | Matsuo et al. | 524/275 |
| 4,302,371 | 11/1981 | Matsuo et al. | 524/275 |
| 4,640,730 | 2/1987 | Streets et al. | 524/505 |
| 4,764,535 | 8/1988 | Leicht | 524/271 |

FOREIGN PATENT DOCUMENTS

| | | | |
|---|---|---|---|
| 0000517 | of 1886 | United Kingdom | 106/241 |
| 19723 | of 1907 | United Kingdom | 106/241 |

OTHER PUBLICATIONS

Sanderson, "Resin Derivatives in Paint Products", Ind. and Eng. Chem., vol. 26, Jan. 1934.

*Primary Examiner*—John Kight, III
*Assistant Examiner*—Dennis R. Daley
*Attorney, Agent, or Firm*—Edward J. Sites

[57] ABSTRACT

Improved rosin ester compositions are provided having diminished tendency toward hazing concomitant with good viscosity stability when employed in adhesive systems such as hot melt adhesive systems. Addition of zinc composition to rosin ester formulations in an effective amount serves to secure these improvements. Zinc oxide, zinc hydroxide and zinc salts of organic acids are suitable for employment with zinc resinates being preferred in accordance with the practice of certain embodiments.

17 Claims, No Drawings

STABILIZED ROSIN ESTERS AND HOT MELT ADHESIVES CONTAINING THEM

This is a continuation of application Ser. No. 211,499, filed Jun. 24, 1988, now abandoned.

BACKGROUND OF THE INVENTION

This invention relates to rosin ester based hot melt adhesives and, more specifically, to the stabilization of such adhesives with zinc salts.

Rosin is the common resin of several varieties of the pine tree. It is mainly a mixture of seven different twenty-carbon monocarboxylic acids and other minor components. The rosins to which this invention relates include gum rosin, wood rosin, and tall oil rosin or the rosin acids contained therein, such as abietic acid.

It is possible to esterify rosin; the resulting rosin esters have numerous applications, including many in the adhesives industry. For example, rosin esters impart wetting and hot tack to commercial hot melt adhesives; ethylene-vinyl acetate (EVA) based hot melt adhesives often contain up to 65% rosin ester as a tackifier. Rosin esters are also used in solvent-based and water-based adhesive systems.

Several factors generally govern the choice of a rosin ester in an EVA-based hot melt adhesive system. Two major factors are the compatibility of the rosin ester with other components of the system and the effect the rosin ester has on the viscosity stability of the system.

The compatibility of a given rosin ester with other components in hot melt adhesives depends upon a number of factors relating to the process and reagents used in making the ester. Clarity is a desired property for hot melt adhesives; good compatibility is indicated when a hot melt adhesive is clear upon formulation and remains free of haze during thermal aging.

It is also desirable that the viscosity of a hot melt adhesive remain stable for a commercially reasonable period after it is formulated. Viscosity stability, like compatibility, is affected by the process and reagents used to synthesize the rosin ester tackifier, with a commercially significant variation of viscosity over time indicating poor viscosity stability.

Although the particular process and reagents used to synthesize a given rosin ester intimately affect both compatibility and viscosity stability for a hot melt adhesive, those conditions which contribute to good compatibility are not necessarily the same as those which contribute to good viscosity stability. On the contrary, in many cases the conditions which lead to acceptable viscosity stability result in poor compatibility. For example, the esterification of many rosin esters is catalyzed by mineral acid esters and by mineral acids such as phosphorus oxy-acids. Mineral acid esters can be transformed into mineral acids and can thus serve as latent acid catalysts. Rosin esters synthesized with both types of acid catalysts often have excellent compatibility with a wide range of EVA-based hot melt adhesives if the resultant residual acidity in the product is not neutralized. However, the viscosity stability of such un-neutralized systems is usually very poor due to acid-catalyzed degradation of the EVA. Viscosity stability may be achieved for such systems by reducing their acidity. One method for reducing acidity is to treat rosin esters with alkali metal hydroxides. U.S. Pat. No. 4,548,746, Duncan, et al., for example, teaches the use of sodium hydroxide in this regard. However, the hot melt adhesives incorporating esters so neutralized are usually hazy, either upon formulation or upon thermal aging, indicating poor compatibility. Some improvement over sodium hydroxide is seen by neutralization with calcium acetate, but serious hazing problems still remain. Organic amines also neutralize the ester acidity, but impart dark color and haze to hot melt adhesive systems.

Although U.S. Pat. Nos. 168,253 and 4,284,543, each in the name of Hollis, teach the use of a lithium salt to extend molten stability in hot melt adhesive compositions, lithium salts generally impart darker color and higher levels of haze than is commercially desirable.

U.S. Pat. No. 4,725,384, Du Vernet, teaches a process for esterifying rosin with a polyhydric alcohol in the presence of a catalytic amount of phosphinic acid. Magnesium salts of organic acid are used in this process to neutralize the acidity contained therein. Rosin esters synthesized in this manner are said to improve the clarity and viscosity stability of EVA-based hot melt adhesives into which they are incorporated as tackifiers. The patent specifically teaches the use of magnesium acetate to neutralize the acidity of an ester so synthesized. Such improved rosin esters provide, to corresponding hot melt adhesive formulations, improvement in both compatibility and viscosity stability. Du Vernet also discloses the inoperability of the corresponding calcium salt for this purpose.

It is still desired to provide improved rosin ester compositions comprising rosins esterified with polyhydric alcohols wherein the resulting compositions may be added to hot melt adhesives and other materials to provide such adhesives having a diminished tendency towards hazing and improved viscosity stability.

Accordingly, it is an object of this invention to provide methods for the production of rosin esters with substantial or total neutralization of any acid catalyst employed in their synthesis.

A further object is to provide rosin esters which impart to hot melt adhesives good tackification without significant hazing or instabilities in viscosity.

A further object of the invention is to provide improved rosin esters which have good utility as tackifiers and otherwise and which have all or part of their acidic components neutralized. Yet another object is to improve the physical and chemical properties of rosin esters and improved tackifiers for hot melt and other adhesives produced therefrom.

These and other objects of the invention will become apparent to persons of ordinary skill in the art from a review of the present specification and appended claims.

SUMMARY OF THE INVENTION

It has been found in accordance with this invention that zinc salts, preferably zinc salts of organic acids, can be used to good effect to neutralize excess acidity in rosin ester formulations and that the incorporation of such zinc neutralized rosin ester formulations as tackifiers in hot melt adhesive systems results in adhesives with compatibility and viscosity stability properties superior to hot melt adhesives employing unneutralized rosin esters.

Accordingly, this invention is directed to improved rosin esters comprising rosin esterified such as with polyhydric alcohol. A zinc composition such as zinc oxide, zinc hydroxide, zinc salts of organic acids, and mixtures thereof is added to the esterified rosin.

Methods for the production of improved rosin esters are also provided in accordance with this invention, comprising the steps of esterifying rosin with polyhydric alcohol and admixing with the esterified rosin a zinc composition selected from the group consisting of zinc oxides, zinc hydroxides, zinc organic salts, and mixtures thereof. The amount of the zinc composition is selected to be an amount effective to neutralize acids which may be present in the esterified rosin to a degree sufficient to improve the physical and chemical properties of the rosin esters and adhesives prepared from such esters.

In accordance with the invention, it is possible either to formulate the rosin esters in accordance with methods whereby zinc compositions are added during or subsequent to the esterification step. Alternatively, the zinc compositions disclosed herein as being useful in the practice of the invention may be added to previously-prepared rosin esters to secure improvement in their properties.

In accordance with preferred embodiments of the invention, zinc salts of organic acids are employed for the acid neutralization function. It is preferred that zinc salts of rosin be so employed.

The zinc compositions of this invention are selected both for their capacity to neutralize residual acidity present in many commercially-synthesized rosin esters and for their compatibility with other components of hot melt adhesive formulations into which such rosin esters are incorporated. Much experimentation has been conducted in the hot melt adhesive industry to simultaneously achieve such compatibility together with viscosity stability. The wide variety of metal salts tested have exhibited markedly disparate capacities to both neutralize acidity and achieve compatibility with other hot melt adhesive components. The results of this research have been far from predictable; for example, U.S. Pat. No. 4,725,384, Du Vernet, notes that calcium acetate failed to perform as well as magnesium acetate in this regard, despite the close chemical similarity of the respective divalent metal cations. Thus it is not expected that zinc compositions as taught in this invention would be useful for this role.

It is believed that a wide variety of zinc compositions may be useful herein, including zinc oxide and zinc hydroxide. The preferred compositions for use in this invention, however, are zinc salts of organic acid which can effectively neutralize residual acidity in rosin esters to be employed, e.g. in hot melt adhesive systems. Preferred examples of such organic salts are the zinc salts of rosin and the zinc salts of organic acids such as abietic, acetic, adipic, benzoic, butyric, capric, caproic, caprylic, carbonic, citric, dehydroabietic, dihydroabietic, formic, lactic, lauric, levopimaric, linoleic, linolenic, myristic, oleic, palmitic, phthalic, proprionic, and valeric acid. Most preferred are the zinc salts of rosin, also known as zinc resinate.

The preferred degree of neutralization affected by the compositions of this invention is between twenty-five and one-hundred percent of the residual acid catalysts which may be present, with fifty to seventy-five percent being especially preferred to achieve an optimization of both compatibility and viscosity stability. The addition of an amount of zinc composition in excess of that necessary to effect total neutralization can also give favorable results. Persons of skill in the art will have no difficulty in determining the degree of such neutralization from knowledge of the residual acid catalyst present in rosin ester formulations. It is preferred that rosin ester formulations be tested to ascertain their acid catalyst content and that an amount of zinc composition be added thereto to effect the desired degree of neutralization.

The rosin materials to which this invention relates may be subject to one or more other treatments before their employment in this invention. Representative treatments comprise distillation, disproportionation, hydrogenation, and polymerization. Thus, as will be appreciated, the known processing steps for preparing rosin esters may be employed together with the improvements of this invention.

Advantageously, this invention should be practiced in an inert atmosphere. Since light color is a desirable property for rosin esters and color is sensitive to oxygen exposure, such exposure should be minimized.

In preferred embodiments of this invention, zinc organic salts are prepared by mixing zinc oxide with the organic acid or acids in a solvent such as toluene. Alternately zinc resinates can be prepared by the fusion technique. Where the organic acid comprises abietic acid, dehydroabietic acid, dihydroabietic acid, or rosin, the corresponding salt is generally characterized as a zinc resinate. The zinc salts thus prepared are conveniently added with mixing to molten rosin ester. The resultant rosin ester formulation is allowed to cool and is then suitable for use, such as incorporation into hot melt adhesives. Other means of formulation, such as in other solvents, may also be used.

It has also been found that certain organic tin compounds may effectively neutralize residual acid in rosin ester tackifiers. For example, dibutyl tin oxide at a level of 0.05% to 0.1% gives viscosity stability that is greatly improved as compared with a tackifier that has not been neutralized. Other tin compounds are also expected to be useful.

The invention is further described in the following examples wherein parts and percents are by weight unless otherwise specified.

EXAMPLE 1

Preparation of Zinc Resinate

A 1.0 liter flask was set up in a fume hood with an agitator, a nitrogen purge, and a solvent condensation and return system. To the flask was charged 250 grams Unitol NCY (Union Camp) tall oil rosin. The flask was heated until the acid was molten, agitation was then commenced, about 125 grams of toluene was added and the flask was cooled to about 95° C. A slurry of 14.5 grams zinc oxide, 125 grams toluene, and 1.5 grams water was slowly added. The flask was equipped with an azeotropic water trap, then heated until the water was driven off and the reaction mixture became clear. The flask was then allowed to cool and its contents transferred to a glass jar as zinc resinate, containing approximately 50% solids.

EXAMPLE 2

Preparation of Neutralized Rosin Ester

Five 1.0 liter flasks with agitators and nitrogen purges were set up in a fume hood. To each of the flasks was charged 300 grams pentaerythritol tall oil ester, which was prepared using 0.1% phosphorous acid as catalyst in accordance with U.S. Pat. No. 4,690,783, Johnson, Jr. The flasks were heated until the ester was molten; agitation was then commenced. To each of the flasks was slowly added zinc resinate prepared as in Example 1.

The respective amounts added were 1.9, 3.8, 5.7, 7.6, and 8.4 grams, in order to effect corresponding 25%, 50%, 75%, 100% and 110% neutralizations of residual mineral acid. The toluene was removed and the resin discharged into a pan.

EXAMPLE 3

Preparation of Hot Melt Adhesive

Five ten ounce, unlined, tin-plate cans with agitators were set up in a fume hood. To each can was charged 100 grams of one of the neutralized rosin esters of Example 2, along with 40 grams Be Square 185 (Petrolite) microcrystalline wax. The cans were heated until the contents were molten; agitation was then commenced and 60 grams Elvax 250 (DuPont) ethylene-vinyl acetate slowly added to each. The mixtures were stirred until homogeneous.

A 10 gram sample was taken from each can; the cans were then placed in a 350° C. forced air oven for 96 hours. The samples were tested for color (Gardner 50T) and viscosity (CP on Brookfield Thermocell Viscometer). The cans in the oven were periodically monitored for clarity. After 96 hours, another 10 gram sample was taken from each can then tested for color and viscosity. The data were compared to data obtained using a rosin ester which had not been neutralized as set forth in Example 2; such data are given in the following table.

| % residual mineral acid neutralized | Color initial | Color final | Clarity* 24 hr | 48 hr | 72 hr | 98 hr | % change in viscosity |
|---|---|---|---|---|---|---|---|
| 0   | 3  | 8+ | 0 | 0 | 0 | 0 | +59 |
| 25  | 3  | 8+ | 0 | 0 | 0 | 1 | +52 |
| 50  | 3+ | 9− | 0 | 0 | 0 | 1 | +28 |
| 75  | 3  | 9+ | 0 | 0 | 0 | 0 | +17 |
| 100 | 3+ | 9− | 0 | 0 | 0 | 0 | +8  |
| 110 | 3+ | 9+ | 0 | 0 | 0 | 0 | +11 |

*0 = sparkling clear
1 = very slightly translucent
2 = slightly translucent

As can readily be seen from the foregoing data, the addition of zinc resinate to the hot melt adhesive systems did not have an appreciably negative effect on color, with initial readings consistently in the "three" range and final readings in the "nine" range. Clarity was also impacted minimally, as clear hot melt adhesive samples were obtained even at higher levels of resinate. While the negative effects of added zinc resinate were minimal, the improvement in viscosity stability, as reflected in percentage change in viscosity, was pronounced.

What is claimed is:

1. An improved rosin ester composition comprising a rosin ester and a zinc composition selected from the group consisting of zinc hydroxide, a zinc salt of an organic acid, and mixtures thereof, wherein said zinc composition is present in an amount effective to neutralize a major portion of any acid present in the rosin ester.

2. The composition of claim 1 wherein said zinc composition comprises a zinc salt of an organic acid.

3. The composition of claim 1 wherein said zinc composition comprises zinc resinate.

4. The composition of claim 1 wherein said zinc composition is present in an amount effective to neutralize a major portion of any acid present in the rosin ester to a degree sufficient to impart diminished tendency toward hazing and improved viscosity stability to adhesives comprising said rosin ester composition.

5. The composition of claim 1 wherein said zinc composition is present in an amount effective to neutralize at least seventy-five percent of any acid present in the rosin ester.

6. The composition of claim 1 wherein said zinc composition is present in an amount effective to neutralize substantially all acid present in the rosin ester.

7. The composition of claim 1 wherein said zinc composition is present in an amount in excess of that necessary to effect total neutralization of all acid present in the resin ester.

8. A method for the production of an improved rosin ester composition comprising: (a) providing an esterified rosin; and (b) admixing with said esterified rosin a zinc composition selected from the group consisting of zinc hydroxide, zinc salt of an organic acid, and mixtures thereof; said zinc composition being admixed in an amount effective to neutralize acids present in the esterified rosin to a degree sufficient to impart diminished tendency toward hazing and improved viscosity stability to hot melt adhesives comprising said rosin ester composition.

9. The method of claim 8 wherein said zinc composition comprises a zinc salt of organic acid.

10. The method of claim 8 wherein said zinc composition comprises zinc resinate.

11. The method of claim 8 wherein said zinc composition comprises zinc resinate and said zinc resinate is admixed in an amount effective to neutralize a major portion of any acids present.

12. The method of claim 11 wherein the acids present comprise residual acid catalyst.

13. The method of claim 11 wherein the acids present comprise latent acid catalyst.

14. The method of claim 8 wherein said zinc composition comprises zinc resinate and said zinc resinate is admixed in an amount effective to neutralize at least seventy-five percent of any acids present.

15. The method of claim 8 wherein said zinc composition comprises zinc resinate and said zinc resinate is admixed in an amount effective to neutralize substantially all acids present.

16. An improved tackifier for hot melt adhesives having diminished tendency toward hazing and improved viscosity stability when incorporated in said adhesives, said improved tackifier comprising rosin esterified with polyhydric alcohol and a zinc composition selected from the group consisting of zinc hydroxides, zinc salt of organic acids, and mixtures thereof, wherein said zinc composition is present in an amount effective to neutralize a major portion of any acid present in the rosin ester.

17. A method for improving the physical or chemical properties of rosin ester comprising adding to said ester a zinc composition selected from the group consisting of zinc hydroxide, a zinc salt of organic acids, and mixtures thereof; said zinc composition being admixed in an amount effective to neutralize acids present in the esterified rosin to a degree sufficient to impart diminished tendency toward hazing and improved viscosity stability to hot melt adhesives comprising said rosin ester.

* * * * *